(Model.)

C. W. HERGENRÖDER.
Surveying and Plotting Instrument.

No. 231,799. Patented Aug. 31, 1880.

WITNESSES:

INVENTOR:
C. W. Hergenröder

BY
ATTORNEYS.

(Model.)
C. W. HERGENRÖDER.
Surveying and Plotting Instrument.
No. 231,799. Patented Aug. 31, 1880.
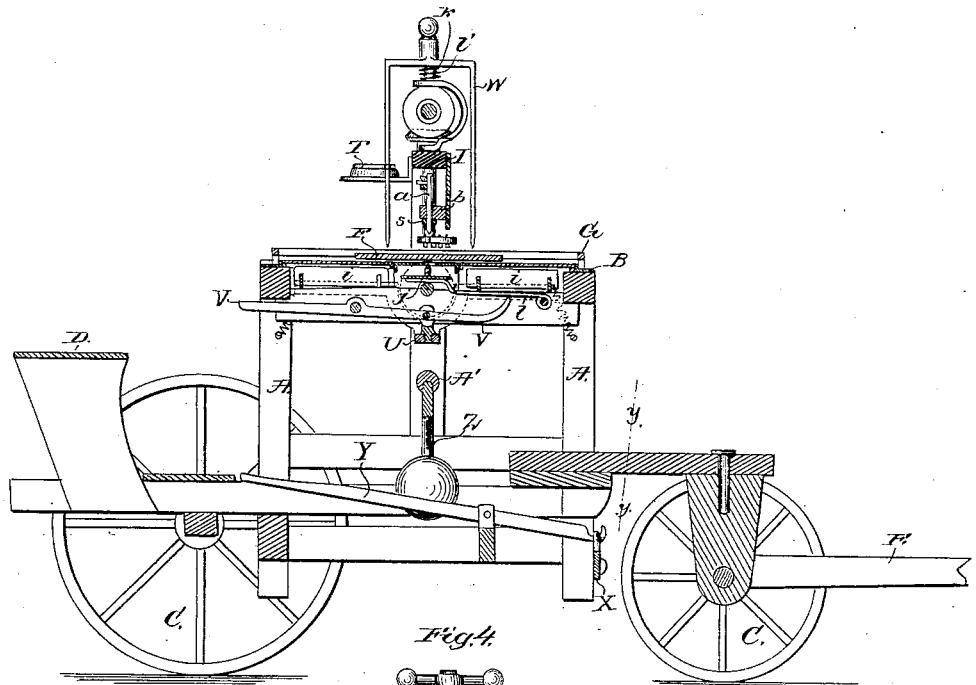
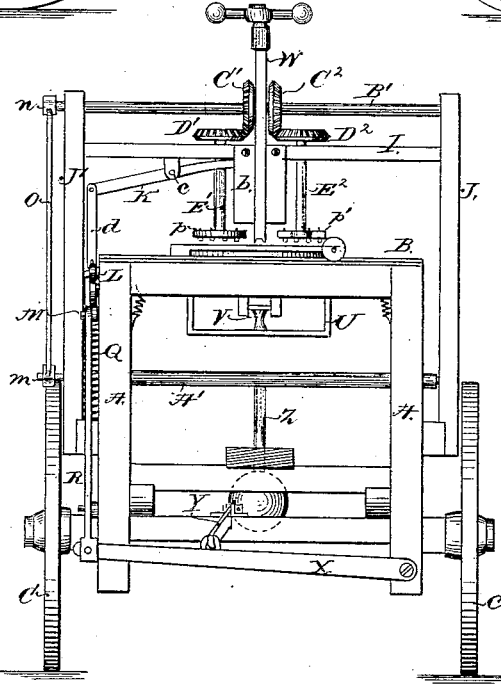
WITNESSES:
INVENTOR:
C. W. Hergenröder
BY
ATTORNEYS.

(Model.) 3 Sheets—Sheet 3.
C. W. HERGENRÖDER.
Surveying and Plotting Instrument.
No. 231,799. Patented Aug. 31, 1880.
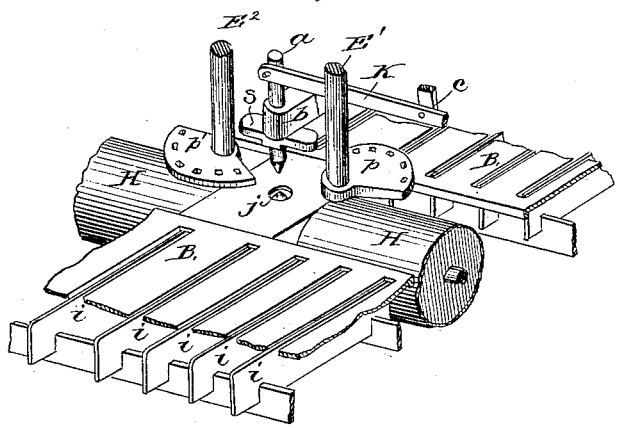
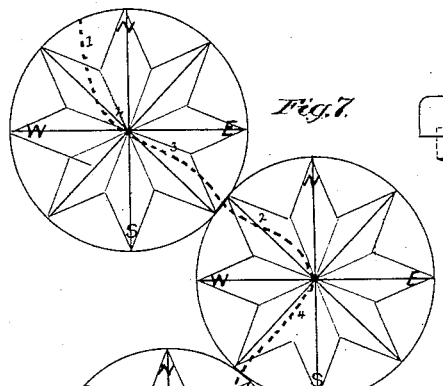
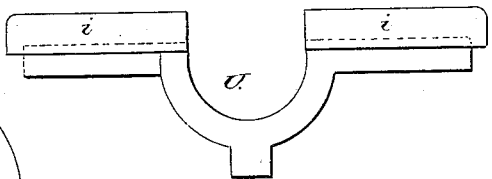
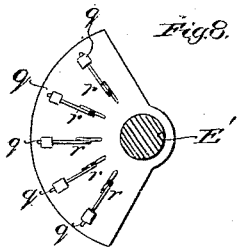
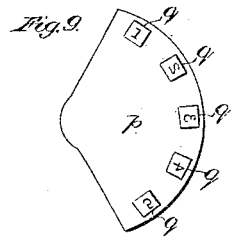
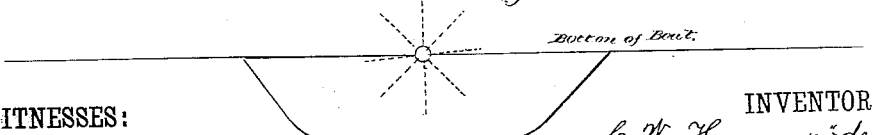
WITNESSES:
John F. C. Brinkert
Edw. W. Byrn
INVENTOR:
C. W. Hergenröder
BY
ATTORNEYS.
N. PETERS, PHOTO-LITHOGRAPHER, WASHINGTON, D. C.

UNITED STATES PATENT OFFICE.

CHRISTIAN W. HERGENRÖDER, OF BALTIMORE, MARYLAND.

SURVEYING AND PLOTTING INSTRUMENT.

SPECIFICATION forming part of Letters Patent No. 231,799, dated August 31, 1880.

Application filed April 24, 1880. (Model.)

*To all whom it may concern:*

Be it known that I, CHRISTIAN W. HERGENRÖDER, of Baltimore city, State of Maryland, have invented a new and Improved Surveying and Plotting Instrument; and I do hereby declare that the following is a full, clear, and exact description of the same, reference being had to the accompanying drawings, forming part of this specification, in which—

Figure 1:
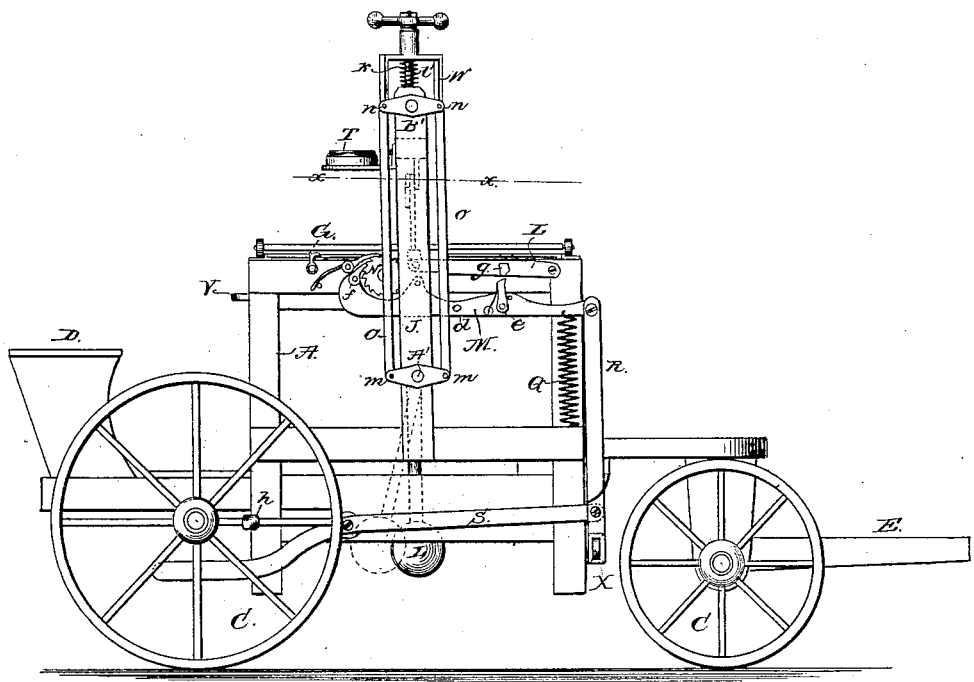
Figure 2:
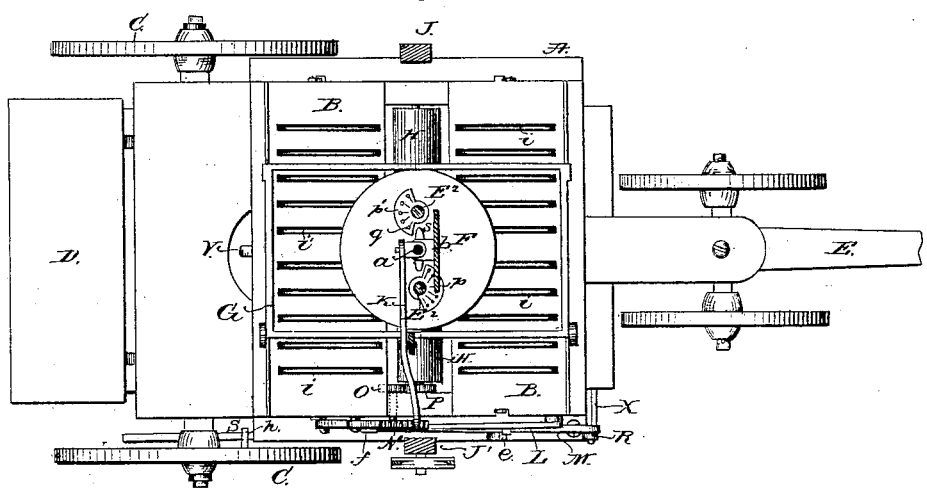

Figure 1 is a side elevation; Fig. 2, a plan view, in section, through the line $x\ x$ of Fig. 1. Fig. 3 is a vertical longitudinal section. Fig. 4 is a front elevation, in section, through the line $y\ y$. Fig. 5 is a perspective of the marking devices and the parts immediately connected thereto. Fig. 6 is a side view of the U-shaped frame for raising the disk. Fig. 7 is a view of three of the paper covers for the disk juxtaposed so as to indicate the direction of the course. Fig. 8 is a top view of one of the quadrantal plates. Fig. 9 is a bottom view of the same. Fig. 10 is a detail relating to the application of the device to ships.

The object of my invention is to provide means whereby a given route or boundary may be rapidly surveyed and platted mechanically.

In the old mode of surveying on foot only about four miles per day can be accomplished, by reason of the necessarily slow progress which the details of this method permits.

My invention contemplates the measuring of the distances and the recording of the same, with the curves, and also the elevations and declinations, with as great rapidity as the route can be traversed in an ordinary wheeled vehicle.

It consists, generally, in a table mounted upon wheels, upon which table there slides freely in every direction a disk or smaller table contained within a movable frame, and which disk bears points corresponding to those of a compass, which is located near by. In the plane of the table are feed-rollers which move the disk intermittently through a tappet-gear actuated by the wheels, while a plunger located above the disk is acted upon by the same mechanism to descend and record a dot upon the disk, the space between which dots indicates the revolution of the wheels, and hence records the distance traveled. In connection with the record-disk a center pin is arranged to rise beneath it and constitute a pivotal point, to operate in conjunction with devices below the table for lifting the disk and devices above for turning the disk as the compass indicates a curve or bend in the route. In connection with the disk and the dotting-plunger, I combine a pendulum arranged to preserve always a perpendicular position, so that as the table adapts its level to an incline the movement of the pendulum brings certain type beneath a crosshead attached to the plunger, which type are struck as the plunger descends, and record the elevation or declination, as the case may be, and also the extent of the same.

In the drawings, A represents a suitable frame-work carrying upon its upper surface a table, B, and itself mounted upon wheels C C. D is the operator's seat, located just in rear of the table and within easy reach of the several parts of the devices on the table.

E is the tongue to which the team is attached, which team may be driven by a man mounted upon the back of one of them, or by a driver occupying a seat on the fore part of the machine. On the surface of the table is placed a disk or smaller round table, F, (see Fig. 2,) which is inclosed by a light frame. G, whose length is just equal to the length of the main table, and whose width is just equal to the diameter of the record-disk or movable round table. The length of this frame allows the said record-disk to move forward or back without moving its inclosing-frame, while the frame itself is arranged on suitable rollers or slides which move in tracks at the front and rear of the table, so that the frame is free to be adjusted with the disk to the right or left of the table. In the middle transverse line of the table, in open spaces in the surface of the same, are arranged two feed-rollers, H H, arranged on the same shaft, which feed-rollers serve to move the disk forward no matter what position the same may be in. Just between these rollers, on the center of the table, is a plane surface, above which reciprocates the pointed plunger $a$, (see Figs. 5 and 3,) which descends upon the disk to register a dot at every revolution of the wheels. This plunger is arranged in a guide, b, hung upon the horizontal cross-bar I above the table, which cross-bar is supported upon side standards, J J'.

For causing this plunger to record the dots on the disk it is jointed to the end of a horizontal lever, K, fulcrumed at c to the cross-bar I, while its outer end is jointed to the vertical link d, Fig. 4, which, in turn, is jointed to the end of a horizontal bar, L, Figs. 1 and 2, jointed at its front end to the frame near the plane of the table. For operating upon this bar L to actuate the plunger, and for effecting the movement of the feed-rolls also, I employ a single train of mechanism, as follows: M is a horizontal lever fulcrumed at d to the frame-work and carrying two spring-pawls, e and f, of which e rises against a lug, g, on bar L, to lift the same and move the plunger and then slide off of the lug, and of which f acts on the alternate stroke to rotate the ratchet-wheel N, which latter is fixed to a short shaft carrying a pinion, O, which engages with a gear-wheel, P, on the feed-roller shaft.

The outer end of lever M is normally held down by a spiral spring, Q, and is raised by a link, R, at the corner and a lever, S, at the bottom of the frame, which lever S projects to the rear and is struck by a tappet, h, Fig. 2, on one of the rear wheels.

It will thus be seen that the feed-rollers intermittently move the disk forward on the table to bring a new space beneath the plunger, and the plunger, acting alternately with the feed-rolls, registers a dot on the disk for every revolution of the wheel bearing the tappet, and the circumference of said wheel being known, the distance will be represented on the disk by the number of dots, which, multiplied by the circumference of the wheel, gives the actual distance traveled over.

For turning an angle or curve the disk is temporarily lifted out of contact with the feed-roller, and is mechanically turned in exact proportion to the turning of the needle of the compass T, which is mounted upon a shelf on the cross-bar I, or at any other point within the sight of the operator.

For raising the disk the table is slotted lengthwise throughout its surface with a series of parallel slots, through which rise a corresponding series of parallel blades, i, carried by a frame, U, beneath the table, (see Figs. 5, 6, and 3,) which frame and its blades ordinarily gravitate to their lowest position, in which the blades are below the surface of the table, but which may be raised to project the blades through the slots in the table by a lever, V, so that said blades will lift the disk from off the rollers. In turning the disk it is not only necessary that the same should be lifted off the rollers, but the disk must move about a center which is immediately beneath the plunger, and as the center of the disk is not always thus beneath the plunger, some means for causing the disk to turn about a point concentric with the plunger is necessary. For this purpose a pivotal pin, j, Figs. 3 and 5, is made to rise through that portion of the table between the rollers, and to bite the disk while said disk is being turned about this point. This pin j is carried by a lever, l, which is struck and raised by the end of lever V at the same time that the latter raises the frame U.

To effect the mechanical turning of the disk, this is done by a forked frame, W, mounted upon a stem, k, rising from the cross-bar I, and held up by a spiral spring, l'. This forked frame has a handle at the top, by which it is grasped and forced down, while its two legs have points on their lower ends that bite the disk on each side of the pivotal pin j, and by which frame W the disk is turned about said point just in the direction and to the extent that the needle of the compass varies with respect to the course of the machine.

Whenever the center of the disk is not beneath the plunger and the disk is turned, said disk swings around the center of the plunger like a cam, and in thus swinging around it carries the frame G with it, adjusting said frame laterally on the table to such new position as will allow the same to act reciprocally to guide the disk in its straight progressive step-by-step movement. In turning angles or short curves this turning of the disk may be done in a short while; but if the curve be of a long radius the turning must be done intermittently and slowly, as the variation in the direction of the needle of the compass progresses from time to time. It may happen that when the disk is elevated by the blades while turning that the tappet on the wheel actuates the feed-roller and plunger, and when this is the case the disk should at once be lowered on the feed-roller by releasing the lever V, in order to allow the distance to be marked. To give the operator warning of when this is about to occur, I pivot to the front of the frame and transversely to the same a lever, X, connected at one end to the corner link, R, and connected also with a treadle-lever, Y, Figs. 3 and 4, arranged longitudinally in the center of the frame, and having its rear end extended to a point just beneath the lever V. Now, when the tappet on the wheel strikes the tappet-lever and raises corner link, R, it also raises the front lever, X, and the front end of treadle-lever Y, depressing its rear end, and the result is that the operator's foot is jogged, a bell rung, or other signal imparted to him, warning him that the plunger is about to descend and that he must temporarily release the pressure on the lever V which lifts the disk. If desired, the treadle-lever may be connected to the lever V to accomplish this result.

For recording the elevation or decline of the route I fix a heavy pendulum, Z, to a rock-shaft, A', beneath the table, and to the end of this rock-shaft I attach opposite cranks m m, connected by rods o o with similar cranks n n on a rock-shaft, B, Fig. 4, arranged in the side standards, J J, just above the cross-bar I. About the center of the machine this rock-shaft B' has two oppositely-facing bevel-wheels, C' C², engaging with horizontal bevel-wheels D' D², fixed on the tops of vertical shafts E' E², suspended on the cross-bar I. These shafts extend to nearly the plane of the disk on the table, and terminate in horizontal quadrantal plate $p\ p'$, on the peripheral portion of which are arranged a series of holes containing type $q$, held up by springs $r$, Figs. 8 and 9, which type bear numbers on their lower surfaces, that may be forced against the disk to produce an impression. One of these quadrantal plates is set upon one side, and the other upon the other side, of the middle transverse line of the table, and one of them serves to indicate the ascent, and the other the descent of the incline, as follows: Upon the plunger is fixed a cross-head, $s$, and when the machine is level and the quadrantal plates $p\ p'$ evenly set with respect to each other upon opposite sides of the transverse line, this cross-head touches neither of the plates when the plunger comes down, but passes between the same, as in Fig. 2. If, however, the machine is ascending an incline the pendulum swings backward and through the rock-shaft A' and rods $o\ o$, rocks, turns the upper rock-shaft and bevel-wheels, and brings the quadrantal plate $p$ beneath the plunger, and the cross-head of the latter in descending strikes one of the type in the said quadrantal plate and causes it to impinge against the disk and make a mark thereon. If instead of an ascent the incline be a descending one, then the pendulum swings in the opposite direction, and the gears being moved in the opposite direction the other quadrantal plate, $p'$, is brought under the range of the cross-head, and when the plunger comes down a type on that quadrantal plate is struck, giving an impression upon the opposite side of the dotted line and indicating a decline. To determine the amount of this inclination the several type on the arc of the quadrantal plates bear different numbers. Thus the first will have the figure 1, the next the figure 2, and so on throughout the series, these numbers being proportioned to the length of the machine or distance between the front and back wheels, so as to indicate one-inch elevation for the length of the machine, (five feet, for instance,) or two inches for this distance, or more, as the incline increases. Now, in going up an ascent, if the pendulum turns the quadrantal plate $p$ and the first type, bearing figure 1, is brought under the cross-head, that type will be struck as the plunger descends, and will indicate an ascent of one inch in five feet. If the second type, bearing figure 2, is brought under it will indicate an ascent of two inches in five feet, and so on, and when the end of the route is reached we have the data stamped on the route as a record, with which, by simple calculation, we may arrive at the whole elevation of a hill, or the descent of an incline, for by taking the distance traveled as recorded by the dotted revolutions of the wheel, and dividing this by the distance from axle to axle of the machine, we will get the number of aliquot parts in which the ascent or descent figures are marked, and by multiplying the whole number of aliquot parts by the ascent or descent numbers recorded the whole height of the hill or depth of the depression may be obtained.

In making use of my invention the distance which it enables me to survey requires a much larger space for record than the simple area of the record-disk F, and I only propose to use this as a carrier for removable covers of paper, Fig. 7, which are prepared by being laid off with points corresponding to those of the compass, each of which, as soon as traced across by the dotted course, is removed and another fresh sheet placed upon the disk, with its points all bearing in precisely the direction of the sheet removed, without disturbing the position of the disk beneath, which can readily be done by comparison with the compass. Then, when the course is completed, these paper sheets are all laid together, with the end of the section of the course on one running into the beginning of the course on the other, as shown in Fig. 7, in which position the course will be fully mapped out with the distance, the curves, and the elevations all marked thereon in a clear and intelligible manner.

My invention shall also serve to register and map out the course of steamboats and all other kinds of vessels of all sizes.

In steamboats lever S may be actuated by a tappet on the shaft of the side wheels or of the screw-propeller, in which case, however, due allowance will have to be made for the lack of positiveness caused by the difference between the distance recorded by the revolutions of the shaft and that actually passed over, which difference will depend upon the resistance of water, wind, and tides. In order to reduce this lack of positiveness to its lowest possible limit, or eventually to avoid it altogether, lever S should not be actuated by the shaft of the side wheels or propeller, but by the shaft of a paddle-wheel placed lengthwise in the center of the bottom of the vessel, or as near there as practicable, which wheel will be turned by the resistance of the water when the vessel moves. This wheel should with its upper part move in a strong iron or steel box, and its lower part, which projects into the water, should be protected sidewise by two parallel-running steel plates vertically suspended one on each side, reaching down at least two feet below the wheel. These plates must be strong enough to withstand the strongest pressure which may be brought to bear upon them by any possible contingency, in order to afford absolute protection to the wheel; and in order to protect the wheel from any pressure in front or rear by any object except the water these plates should extend in front and rear at least three feet, and their edges should be sharpened so as to cut any object which may be thrown against them, and in order to prevent any such object from clinging to them they must have a rounded shape, as shown in Fig. 10. This paddle-wheel, with its protective steel plates, can be attached to steamboats as well as sailing or any other kind of vessels, and its revolutions, as indicated by the plotting apparatus above, will give the distance traveled over as well as will be the case when the apparatus is used in surveying a piece of land. The curves also will be indicated and calculated in the same way with the aid of the compass, and the rocking of the boat may, through the pendulum, be caused to register the height of the waves.

In making use of my invention I do not limit myself to any special form of vehicle or vessel, as in some cases I may construct the device in such a manner as will permit it to be placed in a buggy, wagon, or any ordinary form of vehicle or vessel, and the proper connections to be made with the wheels of the same.

Instead of having the pendulum on a shaft below the table, and connected by rods $o$ $o$ with the shaft above, the pendulum or pendulums may be arranged on the ends of the shaft above the table.

In some applications of my invention it may be desirable to have the feed-rollers capable of moving in the opposite direction to cause the machine to register any backward motion, and for this purpose it will be necessary to modify the feeding devices. Thus, instead of feeding intermittently by the mechanism shown, I may dispense with the same, and in the place thereof connect a small pulley on one of the running-wheels with a large pulley on the end of the feed-roller shaft, and by a continuous direct feed effected through a belt secure the reversal of the feed-rolls by the simple reversal of the running wheels. This will form an important modification when the device is applied to vessels where it would be specially important to note whether or not the vessel was being blown to the rear faster than the engines were propelling her forward.

Having thus described my invention, what I claim as new is—

1. A surveying-instrument consisting of the following elements: a table bearing a freely-moving record-disk, a feed-roll for moving said disk, and a plunger for recording the course thereon, both actuated by the running wheels of the vehicle or its equivalent, as described, means for turning the disk at will, and a pendulum with connecting mechanism operating in conjunction with the plunger for recording the incline, all combined to operate in connection with a compass, substantially as and for the purpose described.

2. The combination of the table bearing a freely-moving record-disk with a feed-roll for moving the same, a plunger actuated by the drive-wheels of the vehicle or its equivalent, as described, for recording the distance on said disk, and means for raising the disk from the feed-rolls and turning the same around at will, all arranged to operate in connection with a compass, substantially as shown and described.

3. The combination, with a horizontal table having feed-rolls in its surface, of a disk free to move thereon and mounted by a compass-chart and a vertically-reciprocating plunger connected with and actuated by the wheels of the vehicle or its equivalent, as described, the said parts being arranged to operate in conjunction with a compass, as and for the purpose described.

4. The combination, with the table having a feed-roll in its surface, of a record-disk and a frame inclosing the same, made of equal length to the table and of a width equal to the diameter of the disk, and free to move on the table transversely to the line of draft, together with a plunger operating vertically upon the disk and connected to and actuated by the wheels of the vehicle or its equivalent, as described.

5. The combination, with the plunger and the feed-rolls, of the lever K, link $d$, bar L, carrying lug $g$, the ratchet and gear-wheels N O P, the lever M, carrying pawls $e$ and $f$, the spring Q, the corner link, R, and the tappet-lever S, operated by the vehicle-wheel or its equivalent, substantially as described.

6. The combination, with the table, the record-disk, and the plunger, of the two feed-rolls arranged in the transverse middle line of the plunger upon the same shaft and separated by a plain surface of the table to allow the disk to be fed when in any position on the table and yet give a solid bearing beneath the plunger, as and for the purpose described.

7. The combination, with the table, the feed-rolls, the plunger, and the record-disk, of a subjacent and vertically-adjustable pivotal pin arranged just beneath the plunger and connected with mechanism whereby it is made to rise, bite, and centralize the disk while it is being turned, as set forth.

8. The combination, with the disk, the plunger, and the feed-rolls, of the adjustable centralizing-pin, an open or slotted table, and a subjacently-arranged and vertically-adjustable set of blades adapted to lift the disk from the feed-rolls and co-operate with the centralizing-pin when the disk is to be turned, as set forth.

9. The combination, with the disk and the table having a vertically-adjustable centralizing-pin beneath it in line with the plunger, of a forked frame turning on the same center as the plunger and having legs or branches adapted to be brought down against the disk on opposite sides of the centering-pin to bite and turn the disk at will.

10. The combination, with the disk and means for turning it, of the parallel-slotted table, the subjacent frame U, carrying parallel blades, the lever V, and the lever $l$, carrying the centering-pin $j$, substantially as and for the purpose described.

11. The combination, with the devices for raising and turning the disk and the devices for actuating the plunger and feeding the disk, of a treadle or lever, Y, connected with the train which actuates the feed-rolls and plunger, and extended to the position of the operator or near lever V, to give notice when the disk must be lowered, as described.

12. The combination, with the plunger and a movable marking-surface, of a pendulum connected with mechanism which by the swing of the pendulum is thrown into gear with the plunger to record the inclines, as described.

13. The combination of the pendulum and the shaft B′, having bevel-wheels C′ C², of the vertical shafts E′ E², bearing bevel-wheels D′ D², and carrying quadrantal plates $p$ $p'$ below, arranged to project upon opposite sides of the transverse middle line and carrying numbered type, as described, and the plunger provided with a cross-head adapted to come in contact with the type of either quadrantal plate according to the swing of the pendulum, as described.

14. The combination of the pendulum Z, the rock-shaft A′, beneath the table, having crank-arms, the rods $o$ $o$, the shaft B′, above the table, carrying similar crank-arms, and bevel-wheels C′ C², the vertical shafts E′ E², having bevel-wheels D′ D², and carrying below quadrantal plates $p$ $p'$, adapted to co-operate with the plunger, as described.

CHRISTIAN W. HERGENRÖDER.

Witnesses:
  E. E. WENCK,
  A. M. HERGENRÖDER.